United States Patent
Puscasu et al.

(10) Patent No.: US 9,887,775 B2
(45) Date of Patent: Feb. 6, 2018

(54) SYNCHRONIZED INFRARED BEACON / INFRARED DETECTION SYSTEM

(71) Applicant: FLIR SYSTEMS, INC., Wilsonville, OR (US)

(72) Inventors: Irina Puscasu, Winchester, MA (US); Bruce Allen Poirier, Windham, NH (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/714,617

(22) Filed: May 18, 2015

(65) Prior Publication Data

US 2015/0263806 A1  Sep. 17, 2015

Related U.S. Application Data

(63) Continuation-in-part of application No. PCT/US2013/070619, filed on Nov. 18, 2013.
(Continued)

(51) Int. Cl.
*H04B 10/11* (2013.01)
*H04W 36/00* (2009.01)
(Continued)

(52) U.S. Cl.
CPC ............... *H04B 10/11* (2013.01); *F41H 1/00* (2013.01); *F41H 13/00* (2013.01); *F41J 5/08* (2013.01); *G01S 1/70* (2013.01); *G01S 17/74* (2013.01)

(58) Field of Classification Search
CPC .......... H04B 10/11; G06F 17/30; H04N 5/225
(Continued)

(56) References Cited

U.S. PATENT DOCUMENTS 4,068,124 A * 1/1978 Kleider ................. G01S 17/026
  250/332
5,147,088 A  9/1992 Smith et al.
(Continued)

FOREIGN PATENT DOCUMENTS

CA  2729172 A1  4/2010
CN  102132290 A  7/2011
(Continued)

OTHER PUBLICATIONS

Van Den Bosch, I, European Patent Office, "Extended European Search Report" in connection with related European Patent Application No. 13854465.5, dated Jun. 3, 2016, 7 pages.
(Continued)

*Primary Examiner* — Oommen Jacob
(74) *Attorney, Agent, or Firm* — Haynes and Boone, LLP

(57) ABSTRACT

A synchronized infrared beacon/infrared detector system. The system may include (A) an infrared beacon module configured to generate a time-varying encoded infrared signal, (B) an infrared detector module configured to capture the encoded infrared signal generated by the beacon module, (C) a synchronizer configured to generate a synchronization signal that controls timing of the beacon module and the detector module, and (D) a processor, in communication with the detector module, configured to analyze the infrared signal captured by the detector module. The infrared signal may be modulated at frequencies undetectable by human vision. The synchronizer signal may be produced independent of the capture of, and without input from, the infrared signal.

22 Claims, 4 Drawing Sheets

Related U.S. Application Data

(60) Provisional application No. 61/727,612, filed on Nov. 16, 2012.

(51) Int. Cl.
| | | |
|---|---|---|
| *H04W 36/14* | (2009.01) | |
| *F41H 1/00* | (2006.01) | |
| *F41H 13/00* | (2006.01) | |
| *F41J 5/08* | (2006.01) | |
| *G01S 17/74* | (2006.01) | |
| *G01S 1/70* | (2006.01) | |

(58) Field of Classification Search
USPC ................................. 398/130, 115
See application file for complete search history.

(56) References Cited

U.S. PATENT DOCUMENTS

| | | | |
|---|---|---|---|
| 5,225,828 | A | 7/1993 | Walleston |
| 5,396,243 | A | 3/1995 | Jalink, Jr. et al. |
| 5,687,930 | A | 11/1997 | Wagner et al. |
| 5,884,294 | A | 3/1999 | Kadar et al. |
| 5,991,428 | A | 11/1999 | Taniguchi |
| 6,317,754 | B1* | 11/2001 | Peng ............... G06F 17/30176 707/610 |
| 6,654,482 | B1 | 11/2003 | Parent et al. |
| 7,310,441 | B2 | 12/2007 | Cowperthwaite et al. |
| 7,395,966 | B2 | 7/2008 | Braiman |
| 7,415,212 | B2* | 8/2008 | Matsushita ............ G06F 3/002 250/206.1 |
| 7,456,754 | B1 | 11/2008 | Haynes et al. |
| 7,474,855 | B2* | 1/2009 | Nishimura ............ G06F 3/011 398/118 |
| 7,649,174 | B2 | 1/2010 | Mammen et al. |
| 7,705,879 | B2* | 4/2010 | Kerr .................... G01S 1/70 250/330 |
| 7,732,769 | B2 | 6/2010 | Snider et al. |
| 7,973,696 | B2 | 7/2011 | Puscasu et al. |
| 8,022,343 | B2 | 11/2011 | Solenne |
| 8,139,945 | B1 | 3/2012 | Amir et al. |
| 8,478,126 | B1* | 7/2013 | Harres ............ H04B 10/1149 398/103 |
| 8,692,198 | B2* | 4/2014 | Jiang ................. H01L 27/1461 250/200 |
| 2002/0106107 | A1 | 8/2002 | MacDonald |
| 2002/0154293 | A1 | 10/2002 | Wells et al. |
| 2002/0176605 | A1 | 11/2002 | Stafsudd et al. |
| 2003/0043280 | A1* | 3/2003 | Nagao ............... B60Q 1/2665 348/216.1 |
| 2003/0091094 | A1* | 5/2003 | Epstein ............. G06Q 30/0283 375/130 |
| 2003/0147651 | A1 | 8/2003 | Roes et al. |
| 2005/0046584 | A1* | 3/2005 | Breed ................. B60C 11/24 340/13.31 |
| 2005/0150697 | A1* | 7/2005 | Altman ................ G06F 3/011 178/19.02 |
| 2006/0159307 | A1 | 7/2006 | Anderson et al. |
| 2006/0181479 | A1 | 8/2006 | Mantese et al. |
| 2007/0125951 | A1 | 6/2007 | Snider et al. |
| 2007/0269177 | A1* | 11/2007 | Braiman ................ G01S 1/70 385/135 |
| 2009/0324015 | A1 | 12/2009 | Way et al. |
| 2010/0329161 | A1* | 12/2010 | Ylanen ................ H04W 88/06 370/310 |
| 2011/0007938 | A1 | 1/2011 | Haynes et al. |
| 2011/0101869 | A1* | 5/2011 | Pope ................... G08C 17/02 315/132 |
| 2011/0128129 | A1* | 6/2011 | Graczyk ........... G06K 17/0022 340/10.33 |
| 2012/0218101 | A1 | 8/2012 | Ford |
| 2012/0263084 | A1* | 10/2012 | Liu .................. H04W 52/0216 370/311 |
| 2013/0279381 | A1* | 10/2013 | Sampath ............ H04W 48/08 370/311 |
| 2015/0208226 | A1* | 7/2015 | Kuusilinna .......... H04W 8/005 455/414.3 |
| 2015/0263806 | A1* | 9/2015 | Puscasu ................ F41H 1/00 398/130 |
| 2015/0289180 | A1* | 10/2015 | Koskinen .......... H04W 36/0033 455/436 |

FOREIGN PATENT DOCUMENTS

| | | |
|---|---|---|
| EP | 2304643 A1 | 4/2011 |
| FR | 2908874 A1 | 5/2008 |
| WO | 2004102462 A2 | 11/2004 |
| WO | 2010044927 A1 | 4/2010 |
| WO | 2011116421 A1 | 9/2011 |

OTHER PUBLICATIONS

Shane Thomas, Authorized Officer, International Searching Authority/US, Commissioner for Patents, "International Search Report" in connection with related International Patent Application No. PCT/US2013/070619, dated Apr. 9, 2014, 2 pages.

Shane Thomas, Authorized Officer, International Searching Authority/US, Commissioner for Patents, "Written Opinion of the International Searching Authority", International Patent Application No. PCT/US2013/070619, dated Apr. 9, 2014, 13 pages.

* cited by examiner

SYNCHRONIZED INFRARED BEACON / INFRARED DETECTION SYSTEM

CROSS-REFERENCE TO PRIORITY APPLICATIONS

This application is a continuation-in-part of PCT Patent Application Serial No. PCT/US2013/070619, filed Nov. 18, 2013, which in turn is based upon and claims the benefit under 35 U.S.C. §119(e) of U.S. Provisional Patent Application Ser. No. 61/727,612, filed Nov. 16, 2012. Each of these priority applications is incorporated herein by reference in its entirety for all purposes.

CROSS-REFERENCES TO OTHER MATERIALS

This application incorporates by reference in their entireties for all purposes the following U.S. patent documents: U.S. Patent Application Publication No. US 2009/0324015, published Dec. 31, 2009; U.S. Pat. No. 7,649,174; and U.S. Pat. No. 7,973,696. In particular, the system described herein may be used for any and all of the applications, and with any and all of the sub-components, described in the '015 publication.

INTRODUCTION

Personnel, vehicles, cargo and aircraft are often marked and tracked, for various purposes. Such marking and tracking, which may be overt or covert, is especially common in the military context. Modern military personnel commonly operate in complex environments that necessitate a high degree of situational awareness to keep themselves, their teammates, and local non-combatants safe. At the same time, covert operations usually require that military personnel not be seen or heard, minimizing the use of overt optical and radio communications. Commonly fielded equipment for covertly marking allied or friendly forces (friendlies) includes near-infrared (NIR) strobe lights, undetectable by the unaided human eye, which provide a signature to image intensifier ($I^2$) devices only, and fixed reflective passive panels, which provide distinctive contrast in the long-wavelength infrared (LWIR). Unfortunately, this equipment leaves military personnel visible using inexpensive, low-level night vision or thermal imaging technology that is now available to insurgents. Thus, there is a need for new systems for identifying allied military personnel and allowing them to communicate.

SUMMARY

The present disclosure provides a synchronized infrared beacon/infrared detector system. The system may include (A) an infrared beacon module configured to generate a time-varying encoded infrared signal, (B) an infrared detector module configured to capture the encoded infrared signal generated by the beacon module, (C) a synchronizer configured to generate a synchronization signal that controls timing of the beacon module and the detector module, and (D) a processor, in communication with the detector module, configured to analyze the infrared signal captured by the detector module. The infrared signal may be modulated at frequencies undetectable by human vision. The synchronizer signal may be produced independent of the capture of, and without input from, the infrared signal. A solution also is offered for situations in which synchronization is denied, but data decoding, tracking, and communication are still possible using the beacon/detector system.

DETAILED DESCRIPTION

Figure 1:
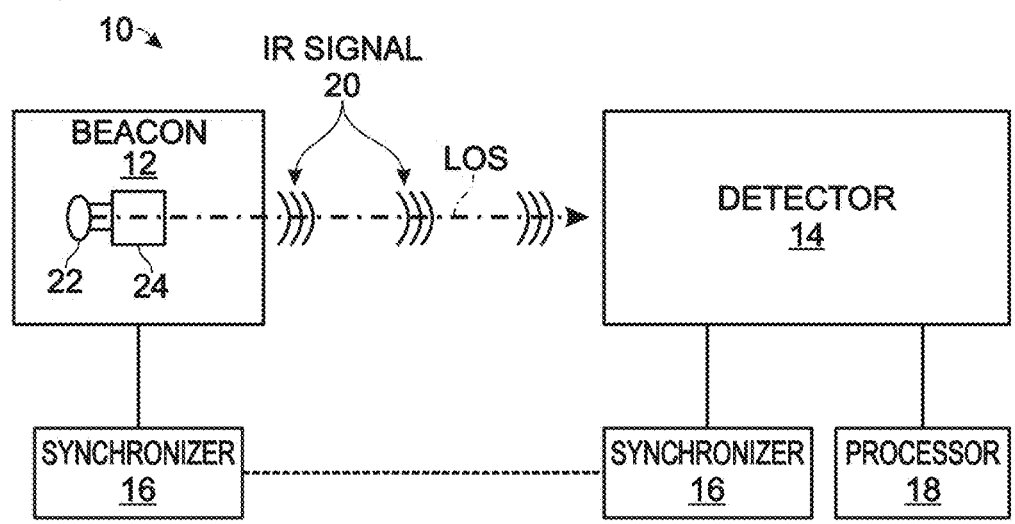
FIG. 1 is a schematic block diagram of an exemplary synchronized infrared emitter/infrared detector system, in accordance with aspects of the present disclosure.

The present disclosure provides a synchronized infrared beacon/infrared detector system. The system may include (A) an infrared beacon module configured to generate a time-varying (modulated) encoded infrared signal, (B) an infrared detector module configured to capture the encoded infrared signal generated by the beacon module, (C) a synchronizer configured to generate a synchronization signal that controls timing of the beacon module and the detector module, and (D) a processor, in communication with the detector module, configured to analyze the infrared signal captured by the detector module. The beacon module may include emitters that incorporate a photonic crystal which controls the wavelength(s) of the infrared signal and which reduces emission at unintended (e.g., shorter) wavelengths. The infrared signal may consist of different wavelengths, or different bands. The infrared signal may consist of pulses and/or other modulations—successive increases and decreases in intensity and/or other characteristics (such as successive ons and offs in a particular pattern)—that optionally occur faster than human vision can detect (i.e., above the human flicker fusion threshold). The detector may be configured to capture an image, in addition to capturing the infrared signal, for example, capturing an image of both the beacon and surrounding background, thereby providing a context for the beacon. The synchronization signal may be produced independent of the capture of, and without input from, the infrared signal and may allow the encoded infrared signal produced by the beacon module to "lock in" with a capture rate, such as an image frame rate, of the detector module. The processor may be further configured to provide information about the infrared signal and/or an associated image. In situations of denied synchronization (e.g., no satellite connection, or intermittent optical line of sight) and/or low-frequency beacon flashing, among others, the beacon and the detector/imager might not be synchronized, or the phase delay between the two, might be varying and unknown. In this situation, the detector and/or the processor can still analyze the beacon signal by sampling the beacon signal at a higher frequency than the beacon signal itself, recognizing the beacon pulsing pattern, and subtracting/decoding the information, thus still allowing for communication and tracking.

The synchronized infrared beacon/infrared detector system described herein allows optical line-of-sight (LOS) identification and communication, for any suitable purpose. The system may operate at relatively longer infrared wavelengths (e.g., MWIR and/or LWIR), outside the relatively shorter wavelength proliferated image intensifier ($I^2$) region, reducing security concerns and enhancing situational awareness and threat assessment. Synchronization of the infrared signal with the detector module increases the range of the system and allows identification beyond that permitted by non-synchronized systems. The beacon frequency, or pulse rate, may be preprogrammed or synchronized using the timing signal from an onboard clock, among others. In addition, encoded digital information may be transmitted (e.g., at low baud rate) from the beacon to the detector and conveyed to system operators using any suitable mechanism (such as being displayed on a screen following automatic image processing). This additional information, above and beyond location, may include individual identification (e.g., name, military unit or function, etc.), health status or life signs (e.g., alive or dead, body temperature, heart rate, respiration, etc.), chemical/biological/nuclear status, and/or global positioning system (GPS) location, among others. Such information may be determined by the beacon module itself and/or obtained from other sensors in wired or wireless communication with the beacon module. The system may have dual-use potential, outside the military, for search and rescue, law enforcement, and Department of Homeland Security (DHS) functions (such as Customs and Border Protection). Such uses may originate and/or terminate on the ground, at sea, or in the air (e.g., ground-to-ground, air-to-ground, and air-to-air, among others). The system may be engineered to operate with existing gear and not to add tactical risk. The system can still operate, and provide communication and tracking, even when synchronization is denied or not-optimized.

Further aspects of the present disclosure are presented in the following sections: (I) definitions, (II) description, and (III) examples.

I. Definitions

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation—Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light—Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation—Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared range having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR radiation has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared range, particularly portions in the far or thermal IR having wavelengths between about 0.1 and 1 mm, alternatively or additionally may be termed millimeter-wave (MMV) wavelengths.

II. Description

FIG. 1 shows a schematic block diagram of an exemplary infrared beacon/infrared detector system 10, in accordance with aspects of the present disclosure. The exemplary system includes an infrared beacon module 12, an infrared detector module 14, a synchronizer 16, and a processor 18. These components may be separate and discrete. Alternatively, some may be grouped to form integral units, such as the beacon module and synchronizer or the detector, synchronizer, and processor. The infrared beacon and infrared detector modules are capable of communicating optically, particularly through line-of-sight (LOS) communication, with the beacon module creating an infrared signal 20 and the detector module capturing the infrared signal. The beacon module, which may alternatively be termed an emitter module, may include one or more high-temperature sources 22, configured to produce infrared radiation, and a wavelength selection mechanism 24, such as a photonic crystal, configured to limit emission from the beacon module to single and/or multiple wavelengths or single or multiple wavelength bands of interest, or combinations thereof. The synchronizer creates a synchronization signal that allows the beacon and detector modules to work in tandem. This tandem operation, in turn, may provide improved signal-to-noise (S/N) ratios, particularly with beacons consisting of efficient fast infrared emitters, with no increase in power consumption. The tandem operation also may allow longer distance recognition for locating, identifying, and tracking applications that enhance situational awareness. The encoded infrared signal may be detected and analyzed against a predetermined encoded signal, and data subtracted from it. The synchronization may be used to perform image processing to improve viewing of the infrared beacon and to track it. Communication can still be established even when the tandem operation is not possible or not optimized, when the detector or processor samples the beacon signal at a higher frequency than the beacon frequency.

A. Beacon Module

The beacon module may be configured to generate an encoded infrared signal, which may alternatively be termed a beacon signal or emitter signal, for use in marking, tracking, and/or other suitable applications.

The beacon module may include a "beacon," or "emitter," configured to generate electromagnetic radiation having known (e.g., predetermined) and/or recognizable properties or signatures. The properties or signatures may include, for example, a signal emitted at a particular wavelength, a particular band of wavelengths, or a particular broad band of wavelengths (i.e., at two or more bands of wavelengths), and/or flashing at a particular frequency or in a particular pulse pattern. The flashing pattern may be regular (i.e., emitted at a single well-defined frequency), or it may be coded to contain information about the signal beacon and/or to facilitate positively identifying the signature of the beacon. In other words, the emitter may have a modulation frequency or pattern or duty cycle or desired rise time or fall time. More generally, the infrared beacon signal properties may include intensity, wavelength, frequency, duration or pulse width, bandwidth(s), and/or temporal or spatial signal pattern, among others, or their variations. Any or all of these properties may be varied. The frequency may be slower than, matched to, or faster than a capture or frame rate of the detector. The frequency may be slower than, matched to, or faster than a human eye is able to detect. The signal pattern may be periodic or non-periodic. The signal may include a predetermined encoded signal for recognition. The signal also may have preprogrammed preinstalled selectable settings, for example, code green (e.g., for "safe" or "all clear") or code red (e.g., for "danger" or "need assistance"). Such settings may be selected using any suitable mechanism, such as a software or hardware switch. Such settings may be triggered using any suitable mechanism, such as optical, electrical, or wireless, remotely or at close range. There may be multiple sets or collections of such settings, for use in different scenarios (such as battlefield, search and rescue, etc.).

The beacon may be configured to produce a signal at least substantially exclusively in the MWIR and/or LWIR wavelengths, without a significant component in the SWIR, NIR, or visible wavelengths. Such beacons may provide a basic identification platform for advanced (MWIR and LWIR) thermal imaging wavebands, without being visible at image intensifier (night vision) wavelengths, allowing their use for covert identification due to the low proliferation of advanced thermal imaging technology that otherwise could be used to intercept the signal. For example, in some embodiments, the beacon may be tuned for and visible in the MWIR band. In this case, the beacon may not be visible in the shorter-wavelength image-intensifier band or the longer-wavelength LWIR band (i.e., there is no "crosstalk" with these bands). In other embodiments, the beacon may be tuned for and visible in the LWIR band, but not in the image-intensifier or MWIR bands, or in both the MWIR and LWIR bands, but not in the image-intensifier band. The wavelength(s) of such beacons may be preset or "tunable." The wavelengths of tunable beacons may be tuned, or adjusted, in response to internal and/or external cues (e.g., via software (by being programmed) and/or via external trigger). In other words, the beacon may be activated remotely by the detector module (e.g., camera/imager), by a user, and/or by a third party (such as a trip wire, disturbance, sensor, equipment, animal, people, and/or other intentional or unintentional cause). The wavelength(s) employed by the beacon may be matched with a detector that can distinguish different wavelengths or wavebands. In other cases, beacons may incorporate static multiple-wavelength or multiple-waveband emitters that can be on all at once or turned on or off alternatively within one beacon for more complex coding and communication.

The beacon, alternatively or in addition, may be configured to produce an intermittent signal at a frequency above the threshold for detection by human vision (i.e., above the human flicker fusion threshold). In this way, the beacon will appear as a static/continuous (gray) object, which may go unnoticed, rather than as a noticeably pulsing beacon, even using advanced thermal imaging technology. Exemplary frequencies may include at or above about 1 Hz, 5 Hz, 10 Hz, 15 Hz, 30 Hz, 60 Hz, or 120 Hz, among others. High-frequency beacons are a significant improvement over current, low-frequency (e.g., 1 Hz) simple pulsed beacons. In particular, whereas slow beacons may be sufficient at close range (up to 2 km, depending on the configuration) and for continuous or low-frequency optical operation, where the operator can recognize the beacon visually on the screen of an infrared imager, at longer distances the lower signal (optical output), background clutter, and frequency of existing infrared beacons do not allow for individual identification, tagging or tracking, or communication. In contrast, the present system may extend the usable distance range via synchronization, image processing, higher signal (optical output), and/or removal of background clutter (e.g., using image processing techniques, such as filtering).

The beacon may include any suitable emitter(s), including but not limited to photonic crystals, thermal emitters, light-emitting diodes (LEDs), lasers, and/or laser diodes. Photonic crystals are periodic nanostructures with repeating internal regions of relatively low and high dielectric coefficient. The geometrical arrangement of the crystal, and the materials composing the crystal, in turn, determine how the electromagnetic radiation will be controlled by the crystal. In particular, the crystals may be constructed or tuned to allow only MWIR or LWIR to be emitted from a hot source and toward the detector. The photonic crystal may be incorporated on a microelectromechanical (MEMS) type structure or thin film, such as a two-dimensional (2D) MEMS platform, reducing thermal mass and increasing the upper range of the frequency of modulation, enabling fast and controllable modulation of the signal, allowing the beacons to be synchronized or locked in with the detector module. In other words, emitters with photonic crystals optionally may be used without additional filters or shutters. The emitter may further incorporate a specifically textured structure, in addition to the photonic crystal. For example, the emitter may incorporate a random texturing of its surface, which allows for resonant emission only in a given band and/or that allows for the emitted radiation to be enhanced broadband in the infrared.

Photonic crystal-based beacons may be particularly efficient, using fewer or smaller batteries and having a lower weight and smaller package. This efficiency has two sources. First, photonic crystal-based beacons put all of the infrared energy only in the optical band of interest rather than spreading it over wider wavebands that are not viewable by the thermal camera or that require filtering. Second, they may be used with wafer-level vacuum packaging that provides thermal isolation of the hot source from the outside world. In this way, energy is used to produce more light rather than more heating of the package. This also has an operational advantage in that the source may appear very "hot" and bright to the detector, yet remain cool to the touch, rendering it intrinsically safe. Relatedly, this may allow use of higher temperature materials (e.g., close to about 1000° C.), creating larger infrared signals (and lower or negligible visible signals) and thus permit operation over longer distances (e.g., up to 5, 8, or 20 km, among others, depending on embodiment). More generally, the system may be used over any suitable distances, including close range (e.g., a few meters to hundreds of meters) to long range (e.g., 5 km to 20 km and beyond). For these and other reasons, photonic-crystal beacons may be useful in military and commercial applications, gas sensing, industrial monitoring, spectroscopy, medical, rescue, marking (such as marking a trail or landing zone), automotive, and maritime, among others. The tracking and display of information may be triggered covertly only by a known user or known equipment or right equipment secure setting, while an unknown user or unknown equipment might not be able to see the beacons, communicate with them, or trigger the tracking and display of information. Beacons used in covert or military applications may be configured to self-destruct if opened (or if opened improperly), especially by an unauthorized user. Beacons and other system components may have security controls, such as secured activation using passwords, fingerprints, retina scans, and/or the like. The secure activation can be implemented for the equipment in general or just for portions or components involved in the tracking and display of information.

The beacon may be controlled using any suitable mechanism, such as a constant or variable voltage. The depth of modulation, when the beacon is pulsed, may depend upon the frequency of modulation, the nature of the applied voltage (e.g., constant or variable), and/or other factors. In some cases, beacon control may include a voice-activated pulse, or a signal coming from a different device (such as another beacon, a sensor, or a detector system, among others). The beacon can be controlled by any suitable mechanism(s), such as mechanically (e.g., a button or switch), optically, electrically, and/or wirelessly, among others.

Multiple beacons may be simultaneously viewed, marked, identified, and tracked in the field. Beacons may also be synchronized among themselves for coordinated communication. For example, beacons can be networked, one beacon can be the master and other beacons can be slaves, each individual beacon can have its own identification (ID) or recognition signal for individual and independent recognition, and so on. Synchronization may be done with a particular phase delay of choice (including no (zero) phase delay). Multiple beacons can represent multiple objects (e.g., with one beacon, or a subset of the multiple beacons, per object). Alternatively, or in addition, multiple beacons may be grouped spatially to function as a single larger beacon, for example, to increase brightness and/or to increase the solid angle subtended. The space between beacons in such a group may be empty or filled with other beacons. Larger beacons may be used to mark larger objects or installations, such as vehicles, and/or to provide visibility over larger distances. The spatial organization of individual beacons within a larger beacon may itself carry information (e.g., one pattern (such as a line or triangle) for personnel carriers, one pattern (such as a circle) for tanks, and so on). Exemplary spatial organizations may include beacons positioned on the vertices of a regular polygon (such as a triangle, square, or pentagon, among others), beacons positioned to form a shape (such as a circle or cross) or a perimeter of such a shape, and so on. Individual beacons within a group of beacons may be of the same or different types.

The beacon itself may comprise a combination of elements, such as emitters, electronics, windows, battery, and housing (or a subset thereof). A separate battery pack may be provided, allowing the beacon module itself to be much smaller, such that it can be soldier-worn (e.g., affixed to a helmet or a shoulder), tethered to the battery pack, for better visibility and/or portability. The infrared beacon may be programmable and may incorporate a microprocessor that allows the signature of the beacon to be programmed and/or changed at will. The signature of the infrared beacon can be programmed to change at desired intervals, such as at different times during the day or from day to day, among others. The infrared beacon may be preprogrammed, or have preprogrammed settings, that can be chosen or triggered using any suitable mechanism, such as mechanically (e.g., a button), optically, electrically, and/or wirelessly, among others. The infrared beacon may remain in an off state or dormant state and be triggered to turn on by the detector module or the GPS base or another third party. The infrared beacon could be addressed this way for only a short time, enhancing its covertness. In addition, the beacon may be directional and, in some cases, decide to turn on emitters only in the direction of the interrogation, while leaving emitters in other directions off. The beacon may include a feedback system, such as a haptic (touch-based) or visible-light feedback system, to confirm when the beacon is operating (emitting a beacon signal) at a nonvisible wavelength.

B. Detector Module

The detector module may be configured to detect an encoded infrared signal, such as the signal produced by the beacon module, and to communicate contents or aspects of the signal to a processor for analysis and display. The detector module may be configured to detect any or all of the properties, or their variations, of the beacon module, such as but not limited to intensity, wavelength, frequency, duration or pulse width, wavelength bandwidth(s), and/or temporal or spatial signal pattern.

The detector module will typically include an imaging detector but may, alternatively or in addition, include a non-imaging detector, depending on embodiment. The two (or more) detectors, when present, may be separate or integrated. Suitable imaging detectors may include, for example, (1) array detectors, such as charge-coupled devices (CODs), charge-injection devices (CIDs), complementary metal-oxide semiconductor (CMOS) arrays, focal plane arrays (FPAs), photodiode arrays, quantum well infrared photodetectors (QWIP), mercury cadmium telluride (HgCdTe) arrays, indium gallium arsenide (InGaAs) arrays, indium antimonide (InSb) arrays, bolometer arrays, and the like, and/or (2) arrays of non-imaging (point) detectors. Suitable non-imaging detectors may include, for example, photomultiplier tubes (PMTs), photodiodes, pin photodiodes, avalanche photodiodes, photocells, phototubes, and the like. Non-imaging detectors may preferentially incorporate solid state elements, such as photodiodes or photocells, to enhance reliability and reduce power consumption. In embodiments in which the detector module is exclusively non-imaging, the infrared signal may be captured and analyzed mostly or exclusively for its information content. Detectors may be sensitive to the intensity, wavelength, polarization, and/or coherence of the detected imaging energy, among other properties, as well as spatial and/or temporal variations thereof.

The detector module may include multiple detectors or imaging modules that can operate in one wavelength band or multiple wavelength bands. These multiple detectors or imaging modules may provide separate images of the scene, in the various detection bands or subbands, or they may fuse information from various bands to augment the recognition of the beacon in a scene, day or night.

The detector module may include additional functionalities. For example, the module may include a laser or other light source that can be used to activate or trigger the beacon module and/or to act as a designator and/or rangefinder. The module also may include a transmitter capable of communicating information of interest to the beacon, allowing for multiple-way communication.

C. Synchronizer

The synchronizer may be configured to synchronize the beacon and detector modules, so that the detector module can selectively acquire images when the beacon module is creating, or not creating, a signal. Synchronization may help to reduce or prevent aliasing of the signal. Synchronization can be made with any incoming phase delay, including zero or nonzero phase delays. The synchronizer may operate via any suitable mechanism, for example, creating a synchronization signal, such as a pulse sequence, that controls the timing of the beacon and detector modules. For example, the synchronization signal may drive the beacon to create a digital "Morse code" signal and drive the detector in synchrony, or selectively in and out of synchrony, to detect and decode the signal. The synchronizer may speed up or slow down the detector module to match a capture or frame rate of the detector module with the frequency of the emitter. The synchronizer components associated with the beacon module and detector module may be completely independent, or they may communicate and possibly coordinate their timing functions (as represented by the dashed line in FIG. 1).

The beacon(s) may be synchronized with the detector(s) using any suitable mechanism(s). For example, the beacon may be synchronized with the detector by preprogramming the beacon and detector so that the detector knows and can work with the beacon signal. The beacon also may be synchronized with the detector using onboard clocks, such as GPS clocks, that can control the beacon and detector at the same or complementary rates. These clocks may be used in both the beacon and detector modules. The synchronization of the beacon and the detector, as noted elsewhere in this disclosure, has a significant added benefit in that it can suppress visibility by detectors that are not synchronized with the signal. The beacon also may be synchronized with the detector using radio-frequency (RF) and/or infrared signals.

Locking the beacon and detector independent of capturing the infrared signal from the beacon may allow faster and more reliable identification of the beacon, over longer distances, and reading of any encoded information. In particular, prior systems, such as the system described in U.S. Patent Application Publication No. US2009/0324015, published Dec. 31, 2009, had to perform steps that may be obviated by such locking, for example, the preliminary step of extracting the beacon "pulse rate" or "clock" from the received beacon signal. Synchronization also may increase battery lifetimes. However, despite these advantages, the detector module may be augmented, in some embodiments, by a low-cost, signal-detecting, non-imaging device to recognize the beacon and trigger synchronization with an imaging detector. Captured images of the emitting beacon may be synchronized with subsequent flashes to increase the signal-to-noise ratio of the captured images and also to allow for low-rate information transfer. The synchronizer also may synchronize multiple beacons with each other, with zero phase delay or with nonzero phase delay. Each individual beacon can have its own encoded information and signature. The multiple beacons may operate independently and be identified and tracked independently (for example, by being individually marked and identified, each with its own particular signature). Alternatively, or in addition, some or all the beacons may form one or more local or global networks, for example, synchronized with one another to be seen and recognized more easily by the detector module. Beacons also may be synchronized to have a cascade effect, with a delay in between to simulate a moving object. The system may track one beacon, or multiple beacons at the same time, and display critical information on a screen or other output device.

In summary, synchronization can be performed via internal clock, GPS (or other external clock), or a predetermined synchronization pattern that the detector would analyze and recognize or deny, and to which it would synchronize (i.e., synchronization via pattern recognition).

D. Processor

The processor may be configured to receive the infrared signal captured by the detector module, or some representation of that signal, and to use it to identify the beacon signature and pinpoint, decode, and track it. The processor may be associated with, or integral with, the detector module and be configured to perform image processing, identification, decoding, display, tracking, and/or communication and interrogation, with or without external devices. The processor may include a field-programmable gate array (FPGA), digital signal processing (DSP), a tracker, and/or software, among others. Analysis of the signal may include any form of analysis sufficient to determine whether the signal corresponds to a particular beacon or other emitter to be tracked and to extract any associated information. This analysis may involve determining if the infrared signal includes a particular signature, which is the signature known to be emitted by the sought after beacon(s). This determination may include extracting a flashing frequency profile from the signal and comparing the extracted profile to a desired profile. Both the extracted profile and the desired profile (corresponding to the beacon(s) to be tracked) may be periodic with a well-defined frequency, or the frequency profiles may include frequencies that change over time in some fashion, which may be beneficial for encoding the beacon signal to make the beacon more difficult for an unauthorized party to track. The beacon(s) can be tracked by recognition of the emission of electromagnetic radiation having a known or recognizable property or signature, such as a particular wavelength or bandwidth or broadband signature, intensity, polarization, duration or pulse width, frequency or flashing in a particular pulse pattern, or temporal or spatial signal pattern. The flashing pattern may be regular (i.e., emitted at a well-defined frequency). Alternatively, or in addition, it may be at least partially irregular, or non-periodic, and coded to contain information about the beacon (signal emitter) and/or to facilitate positively identifying the signature. Image data may be processed by subtracting scaled images acquired when the emitter is off from scaled images acquired when the emitter is on, marking the beacon on screen, and tracking and displaying transmitted data. Image processing to improve the signal-to-noise ratio may include averaging over multiple frames when the beacon module is on or off, subtracting images acquired when the beacon module is on from images acquired when the beacon module is off, or vice versa, temporal and spatial filtering, optical filtering, scaling, identifying, marking, and/or displaying, among others.

In special situations, for example when synchronization is denied or is intermittent, or when the frequency of the beacon signal is low (for example, 1 Hz, 2 Hz, 3 Hz, or the like), data encoding and communication are still possible using the beacon/detector system. The processor can sample the received data from the beacon, using a higher frequency rate than the frequency of the beacon signal, with minimal or no aliasing, can recognize the pre-programmed pattern in the beacon signal and provide decoding and communication.

Figure 5:
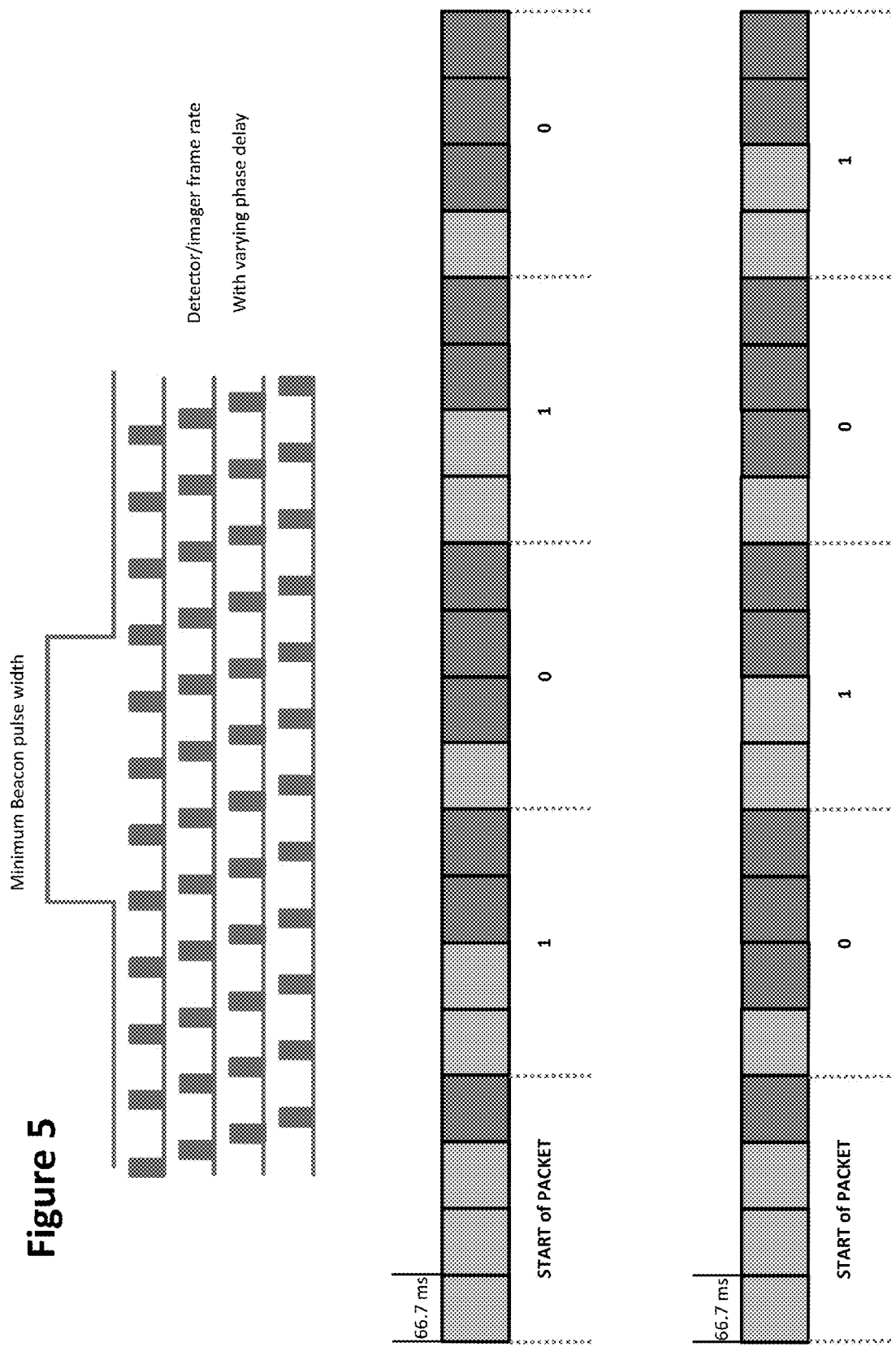
FIG. 5 is an illustration of a single, beacon flash/pulse being sampled by the detector/imager system with varying phase delay in a low-frequency communication or synchronization-denied scenario.

FIG. 5 is an illustration of a single, beacon flash/pulse being sampled, by the detector/imager system with varying phase delay in a low-frequency communication or synchronization-denied scenario. Here, the minimum pulse width is 66.7 ms, the sample period is 16.67 ms, a sub-packet is four times the minimum pulse width, and the packet time is 20 times the minimum pulse width, or 1.33 seconds. The pulse frequency is constant, and the pulse width varies.

Figure 6:
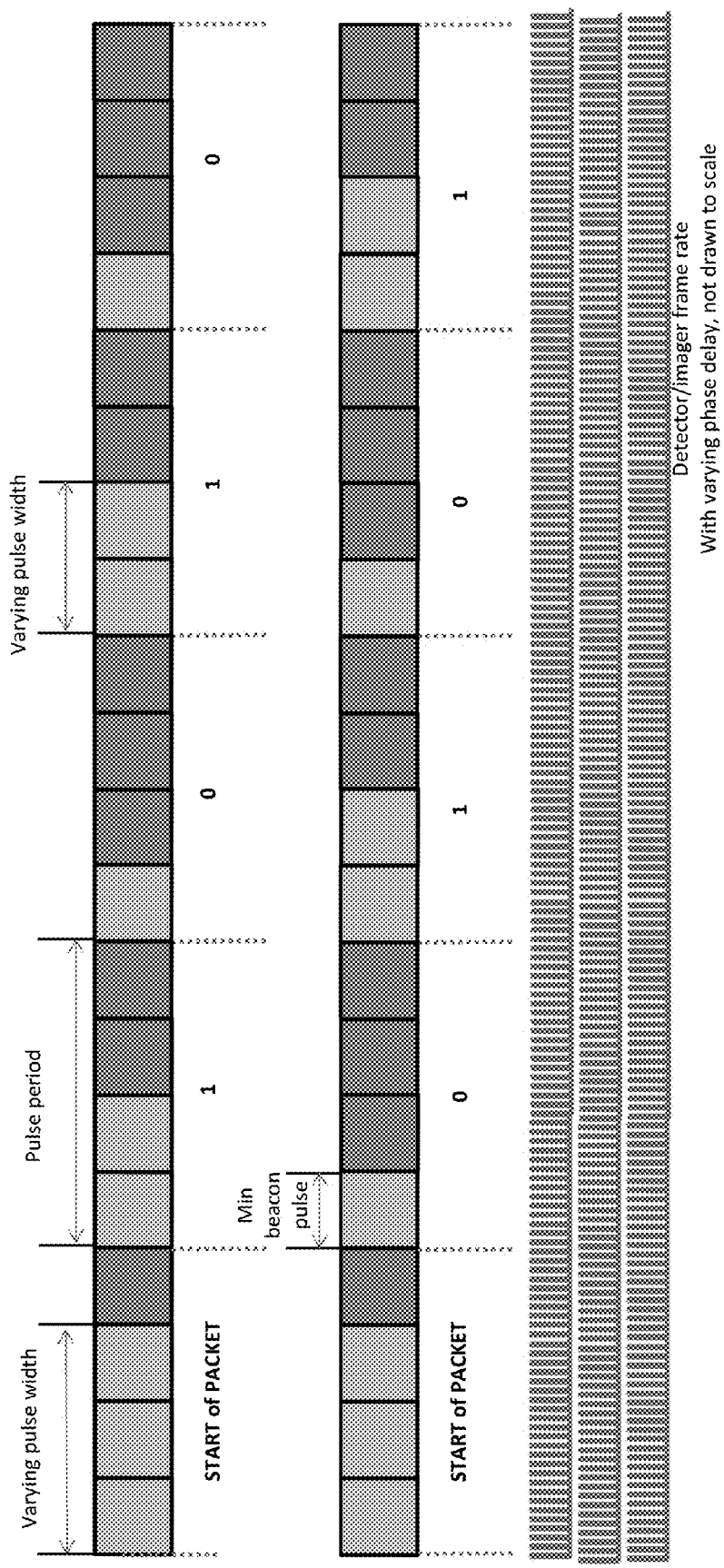
FIG. 6 shows communication in a low-frequency communication or synchronization-denied scenario in which the detector/processor system samples the beacon signal.

FIG. 6 shows communication in a low-frequency communication or synchronization-denied scenario in which the detector/processor system samples the beacon signal. An example is given where the beacon's minimum pulse width is 66.7 ms, and the detector's frame rate or the sample period is 16.67 ms (i.e., one-fourth the minimum pulse width). The beacon sends information in packets of 1.33 seconds that contain 5 pulse periods or sub-packets (first sub-packet is a recognition sub-packet called start of the packet). The beacon pulse frequency is constant. The beacon pulse width varies. The beacon can be programmed to emit a pulse that has a constant frequency but has a varying pulse width. For example, the beacon also can be programmed to emit a wide data pulse or a narrow data pulse. The detector/imager would average over the duration of the pulse when the beacon is on, detect the pulse width, and assign coding designations of zero or one (for example, narrow pulse=0 and wide pulse=1) or alphanumeric based on the pulse width. For example, the pulse width can be one, two, or three minimum pulse widths, among others. It is anticipated that individual beacons will transmit unique, 4-bit codes, but the system is not limited to this incarnation. The minimum pulse width is one-fourth the pulse period. Consequently, the beacon's signal bandwidth is two times the beacon pulse frequency. To achieve robust decoding of the beacon signal, the sensor can employ 4× oversampling, which means the sampling frequency can be four times the Nyquist rate (eight times the signal bandwidth). For a sensor operating at a given sample rate or frame rate, the maximum beacon pulse frequency can be calculated, as follows: Fbeaconpulse=Fdetectorframerate divided by 16. For example, the maximum beacon pulse frequency that can be reliably detected by a sensor operating at 60 Hz frame rate is 3.75 Hz. The detector module can recognize each beacon and track multiple beacons at the same time.

Further aspects of analyzing the infrared signal, and of the information that it might contain, are described elsewhere in the present disclosure.

III. Examples

The following examples describe selected aspects and embodiments of a synchronized infrared beacon/infrared detector system. These examples are intended for illustration only and should not limit or define the entire scope of the present disclosure.

Example 1. Comparison of Beacon Systems

Figure 2:
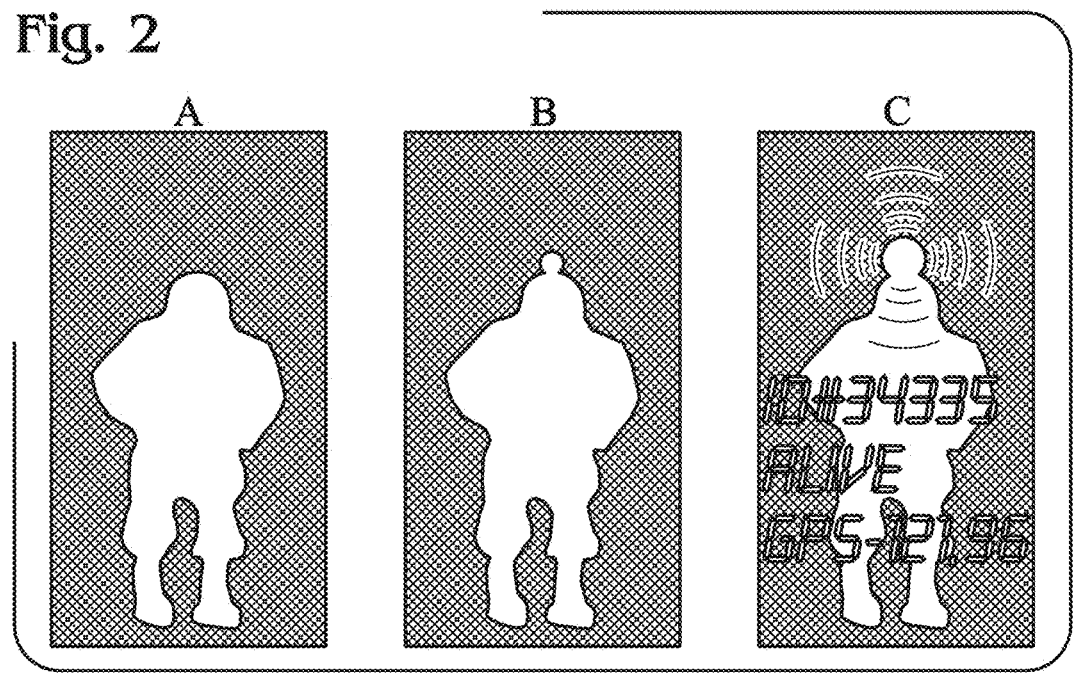
FIG. 2 is a series of schematic thermal images of a soldier (A) with no beacon, (B) with a continuous beacon, and (C) with a flashing beacon synchronized with an infrared imaging system, in accordance with aspects of the present disclosure.

This example compares night vision images obtained using different beacon systems; see FIG. 2. Specifically, FIG. 2 shows three schematic thermal images of a soldier. In these images, the relatively warmer soldier is visible as a light silhouette, due to thermal emissions, against a relatively cooler dark background. Panel A shows the soldier with no beacon (silhouette only). Panel B shows the soldier with an existing helmet-mounted continuous beacon. This beacon alters the thermal profile of the soldier and is visible, when the soldier is upright, as an extension of the soldier's silhouette above the soldier's helmet. Panel C shows the soldier with a helmet-mounted flashing beacon synchronized with an infrared imaging system, in accordance with aspects of the present disclosure. This beacon, which may be detected in an entirely different wavelength regime than that used to collect the image, is portrayed in this example as an overlay that may include a graphic showing the location of the beacon in the image (again, atop the helmet) and, optionally, further information such as a numerical identifier (denoted "ID#34335"), a life sign indicator (denoted "Alive"), and/or a location indicator (denoted "GPS-121-96"), among others. The overlay may be grayscale and/or colored. Actual thermal images corresponding to the silhouettes in FIG. 2 appear in FIG. 3 in U.S. Provisional Patent Application Ser. No. 61/727,612, filed Nov. 16, 2012, which is incorporated herein by reference.

Example 2. Exemplary Synchronization Protocols

Figure 3:
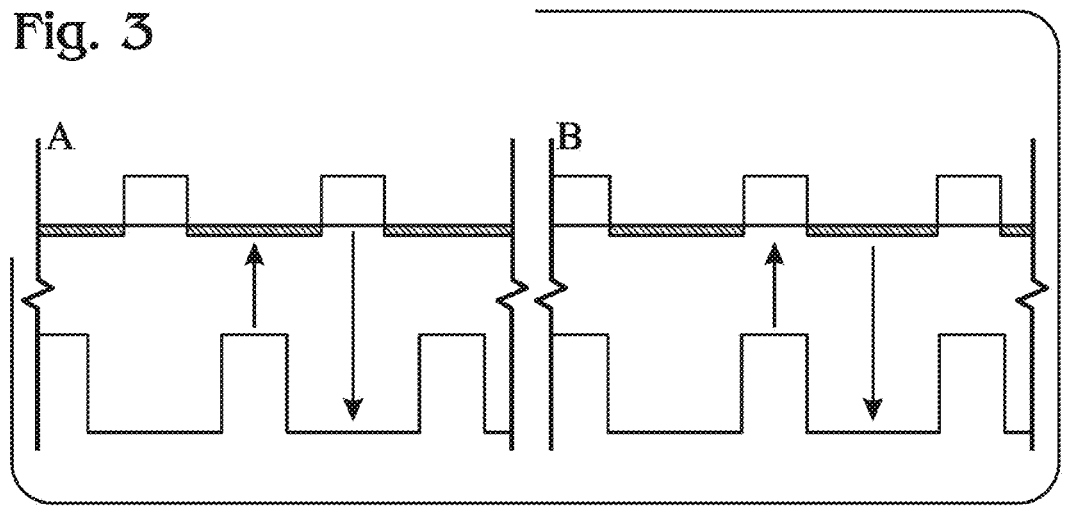
FIG. 3 is a pair of schematic representations of exemplary protocols for synchronizing an infrared beacon and an infrared camera.

This example describes exemplary protocols for synchronizing an infrared beacon and an infrared camera; see FIG. 3. Specifically, FIG. 3 shows schematic representations of two such synchronization protocols. Panel A shows a first protocol: in synch, half periodicity delay; matching on-to-on times between infrared beacon and infrared detector. Panel B shows a second protocol: in synch, zero delay; matching on-and-off times between infrared beacon and infrared detector. More generally, the synchronizer may use any suitable or desired protocols, depending on the emitter, the detector, the type of information to be captured and analyzed, and so on.

In special situations, for example when synchronization is denied or is intermittent, or when the frequency of the beacon signal frequency is low, among others, data encoding and decoding and communication are still possible using the beacon/detector system. The processor can sample the received data from the beacon, using a higher frequency rate than the beacon signal's frequency, with minimal or no aliasing, can recognize the pre-programmed pattern in the beacon signal, and provide decoding, communication, and tracking.

Example 3. Exemplary Pulse Patterns

Figure 4:
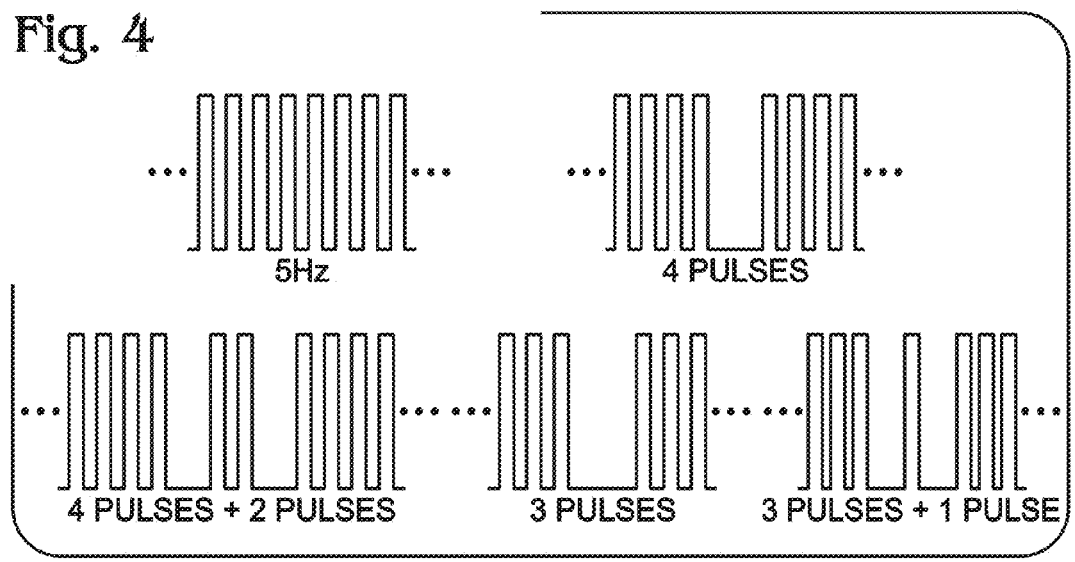
FIG. 4 is a set of schematic representations of exemplary pulse patterns emitted by a beacon.

This example describes exemplary pulse patterns representing beacon emissions; see FIG. 4. Specifically, FIG. 4 shows five such pulse patterns, all at the same arbitrary frequency. The top left panel shows a constant pattern: on, off, on, off, and so on (e.g., at a fixed frequency, such as 5 Hz). The top right panel shows a variable pattern: four pulses on, one pulse off, and then repeating. The bottom left panel shows another variable pattern: four pulses on, one pulse off, two pulses on, one pulse off, and then repeating. The bottom center panel shows yet another variable pattern: three pulses on, one pulse off, and then repeating. The bottom right panel shows still yet another variable pattern: three pulses on, one pulse off, one pulse on, one pulse off, and then repeating. These patterns are not exhaustive. For example, the off times may be variable and/or the patterns themselves may be variable (e.g., mixing schemes shown in the drawing). Generally, the beacon/detector system may use any pulse pattern that may be synchronized between beacon and detector. Complex, or even arbitrary, patterns may be used. Increasing complexity may decrease the likelihood of unintended detection and increase the amount of information that may be communicated by the signal. In the latter case, in which the signal is carrying information besides just location, the beacon may effectively provide a mechanism for low baud-rate data transmission.

Different strategies may be employed depending on whether an eye or a processor is tasked with recognizing the beacon. At frequencies below the flicker fusion (human eye) threshold, frequencies or pulse patterns that attract the human eye to the beacon in a display may be used, such as three on, one off; four on, two off; or small information Morse-code like pulses. In such cases, preferred frequencies are low (e.g., 1 to 5 Hz), with random pauses in between a selected number of pulses. In particular, certain combination of pulses might be more attractive for the eye to recognize in a field of other flickering cluttered lights. In contrast, at frequencies above the flicker fusion (human eye) threshold, frequencies or pulse patterns may be used that are compatible with the detector or imaging system, either at a given frequency or for Morse code data transfer communication, which could be an aperiodic pulse pattern.

Example 4. Selected Embodiments

This example describes selected aspects and embodiments of a synchronized infrared beacon/infrared detector system, presented as a series of numbered paragraphs.

1. A synchronized infrared beacon/infrared detection system, comprising (A) an infrared beacon module configured to generate a time-varying encoded infrared signal; (B) an infrared detector module configured to capture the infrared signal; (C) a synchronizer configured to generate a synchronization signal, wherein the synchronization signal is used to control the beacon module and the detector module; and (D) a processor configured to analyze the infrared signal captured by the detector module.

2. The system of any other numbered paragraph, wherein the synchronization signal is generated independently of capture of the infrared signal.

3. The system of any other numbered paragraph, wherein the synchronizer is configured to allow the detector module to acquire images when the beacon module is selectively on or off (i.e., emitting or not emitting), for example, to facilitate background subtraction.

4. The system of any other numbered paragraph, wherein the synchronization signal comprises a succession of activation pulses configured to turn on and off the beacon module and/or the detector module.

5. The system of any other numbered paragraph, wherein the detector module includes an imaging detector (imager) configured to capture images of the emitter and adjacent background.

6. The system of any other numbered paragraph, wherein the detector module includes a non-imaging detector configured to capture the infrared signal and, optionally, to trigger synchronization with an imaging detector.

7. The system of any other numbered paragraph, wherein the beacon module includes a photonic crystal.

8. The system of any other numbered paragraph, wherein the beacon module includes a microelectromechanical system (MEMS).

9. The system of the preceding numbered paragraph, wherein the MEMS is a two-dimensional MEMS.

10. The system of any other numbered paragraph, wherein the infrared signal is at a well-defined frequency and, optionally, includes missing pulses (for example, as described in Example 3).

11. The system of any other numbered paragraph, wherein the infrared signal is at least partially non-periodic, or irregular, and wherein the non-periodic signal is encoded to provide data communication.

12. The system of any other numbered paragraph, wherein the infrared signal is characterized by a defined frequency that is above the human flicker fusion threshold.

13. The system of any other numbered paragraph, wherein the infrared signal is characterized by a defined frequency selected from the group consisting of at least about 1 Hz, at least about 5 Hz, at least about 10 Hz, at least about 15 Hz, at least about 30 Hz, at least about 60 Hz, at least about 120 Hz, at least about 240 Hz, at least about 480 Hz, at least about 720 Hz, at least about 840 Hz, at least about 960 Hz, and greater than about one kHz.

14. The system of any other numbered paragraph, wherein the infrared signal is characterized by a defined frequency that is an integer multiple of a frame rate of the detector (e.g., 2, 3, 4, or more times the frame rate) or a fraction of the frame rate (e.g., 1/2, 1/3, 1/4, 2/3, 3/2, 3/4, 4/3 of the frame rate (or more generally m/n of the frame rate, where m and n are integers)).

15. The system of any other numbered paragraph, the detector module having a frame rate at which it acquires images, wherein the frame rate can be adjusted to match, or be proportional to, the frequency of the beacon module (emitter).

16. The system of any other numbered paragraph, wherein the beacon module (emitter) is capable of emitting radiation in one, two, or multiple narrow or broadband wavebands, including but not limited to wavebands within MWIR and LWIR, and/or SWIR, and/or NIR, and wherein the beacon module is tuned to a desired waveband or set of wavebands.

17. The system of any other numbered paragraph, wherein the beacon module is capable of emitting radiation at individual wavelengths, or in narrow or broadband wavebands, that can be tunable and selectable.

18. The system of any other numbered paragraph, wherein the beacon module (emitter) emits radiation and the infrared signal is in the MWIR and/or LWIR wavebands.

19. The system of any other numbered paragraph, wherein the beacon module (emitter) does not emit significant amounts of radiation (detectable against background) in the visible or SWIR wavebands.

20. The system of any other numbered paragraph, wherein the synchronizer includes at least one clock.

21. The system of any other numbered paragraph, wherein the synchronizer includes a signal pattern recognition, such as temporal and/or spatial pattern recognition, to recognize the beacon and synchronize to it, other than through the means of using a clock.

22. The system of the preceding numbered paragraph, wherein the clock is a GPS clock.

23. The system of any other numbered paragraph, wherein the detection module includes a non-imaging device to recognize the infrared signal and trigger synchronization with an imaging device.

24. The system of any other numbered paragraph, wherein the infrared signal is coded to contain information about the signal emitter or to facilitate positively identifying a signature.

25. The system of any other numbered paragraph, wherein the encoded infrared signal is detected, analyzed against a predetermined encoded signal, and data is optionally subtracted from it.

26. The system of any other numbered paragraph, wherein the beacon module further includes a spectral filter.

27. The system of any other numbered paragraph, wherein the detector module can visualize the beacon module from distances up to at least about 5 km.

28. The system of any other numbered paragraph, wherein the emitter appears as a static, or continuous, gray object unless the beacon and detector modules are synchronized.

29. The system of any other numbered paragraph, wherein the detector module includes a filter configured to filter out electromagnetic radiation having properties outside a desired range.

30. The system of any other numbered paragraph, wherein the detector module includes a filter configured to filter out signals having a flashing frequency profile insufficiently correlated to a predetermined signature.

31. The system of any other numbered paragraph, wherein the processor is configured to extract a flashing frequency profile from the infrared signal, compare the extracted profile to a desired profile, and transmit the activation signal to the detector module only if the extracted profile at least substantially matches the desired profile.

32. The system of any other numbered paragraph, further comprising (E) a sensor, in wired or wireless communication with the beacon module, configured to provide information (e.g., about a local condition) to the beacon module that can be encoded in the infrared signal and thereby transmitted to the detector module.

33. The system of the preceding numbered paragraph, wherein the sensor detects vital signs (e.g., heart rate and/or respiration rate) and/or location information (e.g., GPS coordinates).

34. The system of any other number paragraph, further comprising a display, in communication with the processor, configured to show or display an image captured by the detector module showing the beacon module and/or an associated scene.

35. The system of any other numbered paragraph, further comprising a plurality of infrared beacon modules, each configured to generate an optionally distinct time-varying encoded infrared signal, wherein the infrared detector module, the synchronizer, and the processor are configured to function with each beacon module.

36. The system of the preceding numbered paragraph, wherein the plurality of infrared beacon modules are networked, each beacon having its own identification.

37. The system of any other numbered paragraph, wherein the beacon module only generates an infrared signal after being triggered, optionally remotely, for example, by the detector module and/or synchronizer.

38. The system of the preceding numbered paragraph, wherein once triggered the beacon module generates an infrared signal for a predetermined period and/or until triggered to turn off.

39. The system of the two preceding numbered paragraphs, wherein the beacon module is off, not generating an infrared signal, most of the time.

40. The system of any other numbered paragraph, wherein the beacon module includes preprogrammed coded modes that control aspects of the infrared signal.

41. A method of tracking an emitter beacon, comprising (A) providing a beacon module, a detector module, and a synchronizer; (B) generating an encoded infrared signal using the beacon module; (C) detecting the signal using the detector module; and (D) synchronizing the beacon and detector modules, using a synchronization signal, so that there is a defined and predetermined relationship between the emission of radiation by the beacon and the detection of the radiation by the beacon module.

42. The method of numbered paragraph 41, the detector module including an imaging detector, further comprising forming an image showing a scene with the beacon superimposed upon the scene.

43. The method of numbered paragraph 42, further comprising processing the image to remove background clutter (i.e., unwanted information, such as information unrelated to the target marked with the beacon).

44. The method of numbered paragraph 42 or 43, further comprising marking the beacon in the image for easier recognition by the user.

45. The method of any of numbered paragraphs 41 to 44, further comprising providing a plurality of beacon modules, generating an encoded infrared signal using each beacon module, and detecting each of the encoded signals using the detector module.

46. The method of numbered paragraph 45, wherein the plurality of beacon modules is networked, each with its own identification.

47. The method of any of numbered paragraphs 45, 46 where the detector/processor is tracking independently the beacons.

48. A method of communicating and tracking a single beacon module or multiple beacon modules when synchronization with the detector module has been denied or is not optimal, or for low beacon signal frequencies, among others, comprising sampling the beacon signal(s) using a processor, decoding the signal, and providing communication and tracking.

49. A method, comprising (A) providing a beacon module, a detector module, a synchronizer, and a processor; (B) generating an encoded infrared signal using the beacon module; (C) detecting the signal using the detector module; and (D) synchronizing the beacon and detector modules, using a synchronization signal, so that there is a defined and predetermined relationship between the emission of radiation by the beacon and the detection of the radiation by the detector module.

50. The method of numbered paragraph 49, the method being a method of tracking a beacon module, further comprising tracking the beacon module using the processor.

51. The method of numbered paragraph 49, the method being a method of communication, further comprising providing communication between the beacon module and the detector module via the processor.

52. A method, comprising (A) providing a beacon module, a detector module, and a processor; (B) generating an encoded infrared signal using the beacon module; (C) detecting the signal using the detector module; and (D) analyzing and decoding the signal using the processor.

53. The method of numbered paragraph 52, the method being a method of tracking a beacon module, further comprising tracking the beacon module using the processor.

54. The method of numbered paragraph 52, the method being a method of communication, further comprising providing communication between the beacon module and the detector module via the processor.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

We claim:

1. A synchronized infrared beacon/infrared detection system, comprising:
   an infrared beacon module configured to generate a time-varying encoded infrared signal;
   an infrared detector module configured to capture the infrared signal;
   wherein the beacon module and/or the detector module are configured to generate a synchronization signal and to provide the synchronization signal directly between the beacon module and the detector module to control the timing between the beacon module and the detector module; and
   a processor configured to analyze the infrared signal captured by the detector module, wherein the processor is configured to recognize and decode the infrared signal to provide data communication directly between the beacon module and the detector module when synchronization based on the synchronization signal is not established between the beacon module and the detector module.

2. The system of claim 1, wherein the synchronization signal is generated independent of the capture of the infrared signal.

3. The system of claim 1, wherein the infrared detector module comprises a first synchronizer configured to synchronize the infrared detector module based on the synchronization signal to capture the infrared signal when the infrared beacon module is selectively generating the infrared signal.

4. The system of claim 1, wherein the detector module further includes a non-imaging detector configured to capture the infrared signal.

5. The system of claim 1, wherein the infrared signal is characterized by a frequency that is above a human flicker fusion threshold.

6. The system of claim 1, wherein the infrared signal is in a MWIR and/or a LWIR waveband.

7. The system of claim 1, wherein the infrared detector module comprises a first synchronizer, the infrared beacon module comprises a second synchronizer, and wherein the processor is further configured to perform a temporal and/or spatial signal pattern recognition to recognize the infrared signal and synchronize to it.

8. The system of claim 1, wherein the infrared signal is characterized by a defined frequency that is a fraction of, or an integer multiple of, a frame rate of the detector.

9. The system of claim 1, wherein the infrared signal is at least partially non-periodic, and wherein a non-periodic infrared signal is encoded to provide data communication.

10. The system of claim 1, wherein the detector module has a frame rate at which it acquires images, and wherein the frame rate can be adjusted to match, or be proportional to, a frequency of the infrared signal.

11. The system of claim 1, wherein the infrared signal appears as a continuous signal unless the infrared beacon and infrared detector modules are synchronized.

12. The system of claim 1, wherein the detector module includes a filter configured to filter out signals having a flashing frequency profile insufficiently correlated to a predetermined signature.

13. The system of claim 1, wherein the processor is configured to extract a flashing frequency profile from the infrared signal, compare the extracted profile to a desired profile, and transmit an activation signal to the detector module only if the extracted profile matches the desired profile, independent of the synchronization signal.

14. The system of claim 1, wherein the infrared beacon module only generates an infrared signal after being triggered by the synchronization signal.

15. The system of claim 1, further comprising a sensor configured to provide information to the beacon module that can be encoded in the infrared signal and thereby transmitted to the detector module.

16. The system of claim 1, further comprising a plurality of infrared beacon modules, each configured to generate a distinct time-varying encoded infrared signal, wherein the infrared detector module and the processor are configured to function with each beacon module.

17. The system of claim 16, wherein there is a phase delay between the infrared detector module and at least some of the plurality of infrared beacon modules.

18. A method, comprising:
   generating an encoded infrared signal comprising an emission of radiation using a beacon module;
   detecting the signal using a detector module;
   synchronizing between the beacon and detector modules, using a synchronization signal provided directly between the beacon module and the detector module, wherein the synchronization signal is provided from the beacon module to the detector module and/or from the detector module to the beacon module, so that there is a defined and predetermined relationship between the emission of radiation by the beacon module and the detection of the radiation by the detector module;
   tracking the beacon module by extracting a flashing frequency profile from the infrared signal;
   comparing the extracted profile to a desired profile; and
   transmitting an activation signal to the detector module only if the extracted profile matches the desired profile, independent of the synchronization signal.

19. The method of claim 18, further comprising providing communication between the beacon module and the detector module by analyzing, recognizing, and decoding the infrared signal to provide data communication when synchronization is not established.

20. A method, comprising:
synchronizing between a beacon module and a detector module, using a synchronization signal provided directly between the beacon module and the detector module, wherein the synchronization signal is provided from the beacon module to the detector module and/or from the detector module to the beacon module;

generating an encoded infrared signal using the beacon module;

detecting the infrared signal using the detector module; and providing communication directly between the beacon module and the detector module via a processor, wherein the processor analyzes, recognizes, and decodes the beacon signal to provide data communication when synchronization is not established between the beacon module and the detector module.

21. The method of claim 20, further comprising tracking the beacon module by extracting a flashing frequency profile from the infrared signal, comparing the extracted profile to a desired profile, and transmitting an activation signal to the detector module only if the extracted profile matches the desired profile, independent of the synchronization signal.

22. The method of claim 20, further comprising synchronizing between the beacon and detector modules, using the synchronization signal provided directly between the beacon module and the detector module, wherein the synchronization signal is provided from the beacon module to the detector module and/or from the detector module to the beacon module, so that there is a defined and predetermined relationship between emission of radiation by the beacon module and detection of the radiation by the detector module.

* * * * *